US012736745B2

(12) United States Patent
Ishiguro et al.

(10) Patent No.: US 12,736,745 B2
(45) Date of Patent: Sep. 15, 2026

(54) OPTICAL WAVEGUIDE, QUANTUM COMPUTING DEVICE, AND METHOD FOR MANUFACTURING OPTICAL WAVEGUIDE

(71) Applicant: FUJITSU LIMITED, Kawasaki (JP)

(72) Inventors: Tetsuro Ishiguro, Kawasaki (JP); Tetsuya Miyatake, Isehara (JP); Kenichi Kawaguchi, Ebina (JP); Toshiki Iwai, Atsugi (JP); Yoshiyasu Doi, Yokohama (JP); Shintaro Sato, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 18/522,351

(22) Filed: Nov. 29, 2023

(65) Prior Publication Data

US 2024/0094459 A1 Mar. 21, 2024

Related U.S. Application Data

(63) Continuation of application No. PCT/JP2021/022197, filed on Jun. 10, 2021.

(51) Int. Cl.
*G02B 6/12* (2006.01)
*G02B 6/10* (2006.01)
*G06N 10/40* (2022.01)

(52) U.S. Cl.
CPC ............. *G02B 6/107* (2013.01); *G02B 6/105* (2013.01); *G06N 10/40* (2022.01)

(58) Field of Classification Search
CPC .......... G02B 6/107; G02B 6/105; G02B 6/12; G06N 10/40; G06N 10/00; G02F 1/011
See application file for complete search history.

(56) References Cited

U.S. PATENT DOCUMENTS 8,467,637 B2 * 6/2013 Fujikata ................ H10F 77/407 257/471
8,837,544 B2 * 9/2014 Santori .............. G02B 6/12007 372/92
9,231,370 B2 * 1/2016 Sumitomo ........ H01S 5/320275
9,472,741 B2 * 10/2016 Ohno ..................... B82Y 20/00
2007/0277730 A1 12/2007 Rabeau et al.
2008/0219311 A1 9/2008 Bratkovski et al.
(Continued)

FOREIGN PATENT DOCUMENTS

JP 4-333291 A 11/1992
JP 2007-526639 9/2007
(Continued)

OTHER PUBLICATIONS

Extended European Search Report dated Jul. 9, 2024 for corresponding European Patent Application No. 21945158.0, 8 pages.
(Continued)

*Primary Examiner* — Jennifer Doan
(74) *Attorney, Agent, or Firm* — Fujitsu Intellectual Property Center

(57) ABSTRACT

An optical waveguide includes a diamond layer including a first surface, a second surface and a diamond layer including a complex defect; a first clad layer in contact with the first surface; a second clad layer in contact with the second surface and including a polarity; and a metal layer in Schottky contact with the second clad layer.

13 Claims, 20 Drawing Sheets

(56) References Cited

U.S. PATENT DOCUMENTS

| | | | |
|---|---|---|---|
| 2013/0107352 | A1 | 5/2013 | Santori et al. |
| 2018/0348431 | A1 | 12/2018 | Bassett et al. |

FOREIGN PATENT DOCUMENTS

| | | |
|---|---|---|
| JP | 2009-302576 | 12/2009 |
| JP | 2016-157740 | 9/2016 |
| WO | 2005/085946 | 9/2005 |

OTHER PUBLICATIONS

Japanese Office Action dated Jul. 9, 2024 for corresponding Japanese Patent Application No. 2023-526775, with English Translation, 8 pages.
European Office Action dated Nov. 6, 2024 for corresponding European Patent Application No. 21945158.0, 7 pages.
WIPO, International Search Report and its English Translation Written Opinion and English Translation of Relevant Part mailed on Aug. 31, 2021, in connection with PCT/JP2021/022197.
Chinese Office Action dated Mar. 31, 2026 for corresponding Chinese Patent Application No. 202180099029.8, with English Translation, 18 pages. Please note JP-2016-157740-A, JP-2009-302576-A and US-2018/0348431-A were previously cited in an IDS filed on Nov. 29, 2023 .***.

* cited by examiner

Figure 20:
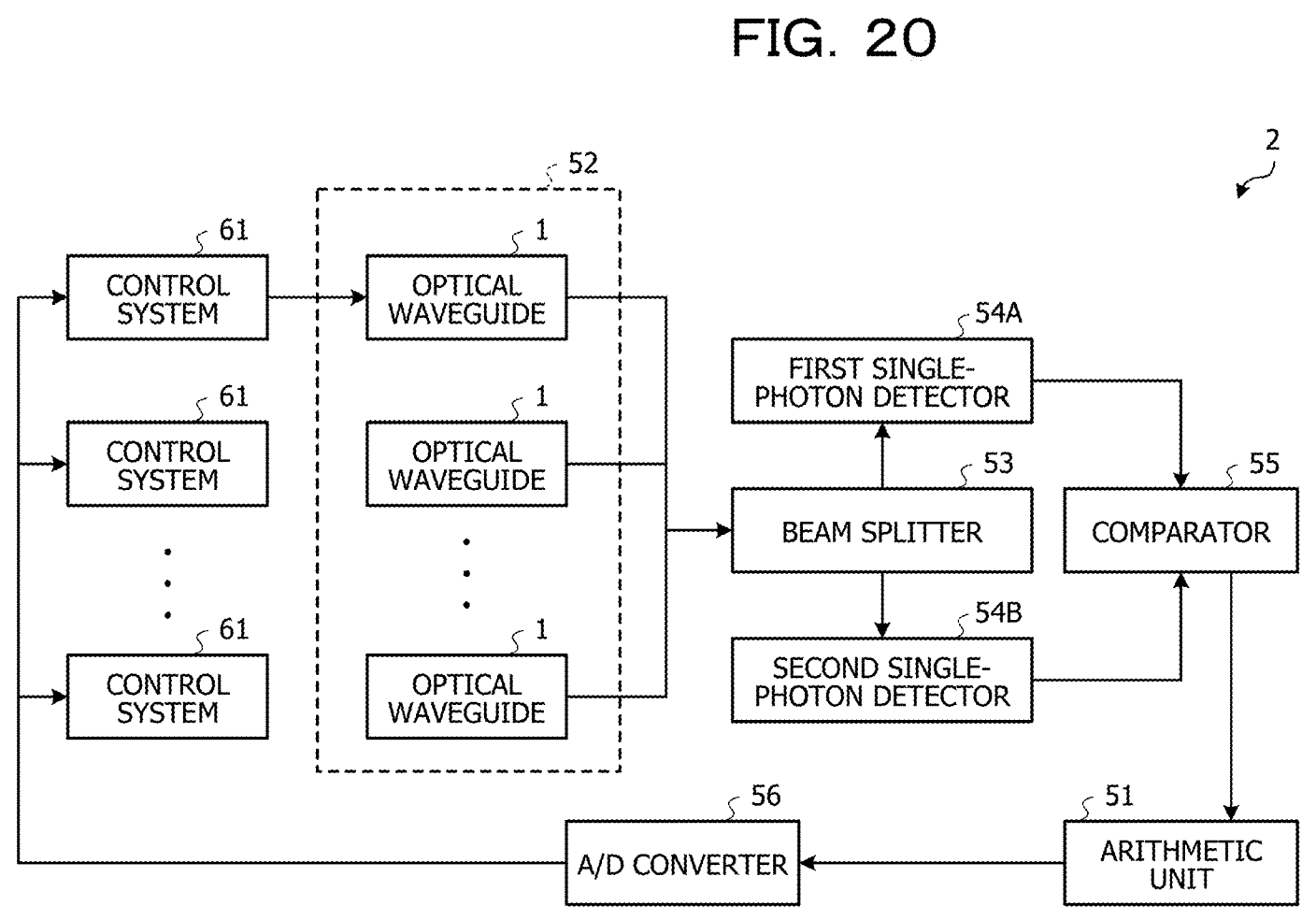

55 COMPARATOR

51 ARITHMETIC UNIT

54A FIRST SINGLE-PHOTON DETECTOR

53 BEAM SPLITTER

54B SECOND SINGLE-PHOTON DETECTOR

56 A/D CONVERTER

52

1 OPTICAL WAVEGUIDE

1 OPTICAL WAVEGUIDE

1 OPTICAL WAVEGUIDE

61 CONTROL SYSTEM

61 CONTROL SYSTEM

61 CONTROL SYSTEM

OPTICAL WAVEGUIDE, QUANTUM COMPUTING DEVICE, AND METHOD FOR MANUFACTURING OPTICAL WAVEGUIDE

CROSS-REFERENCE TO RELATED APPLICATION

This application is a continuation application of International Application PCT/JP2021/022197 filed on Jun. 10, 2021 and designated the U.S., the entire contents of which are incorporated herein by reference.

FIELD

The present disclosure relates to an optical waveguide, a quantum computing device, and a method for manufacturing an optical waveguide.

BACKGROUND

An optical waveguide for a quantum computing device using a color center as a complex defect in a diamond layer has been studied.

U.S. Pat. No. 8,837,544, Japanese National Publication of International Patent Application No. 2007-526639 and U.S. Patent Application Publication No. 2007/0277730 are disclosed as related art.

SUMMARY

According to an aspect of the embodiments, an optical waveguide includes a diamond layer including a first surface, a second surface and a diamond layer including a complex defect; a first clad layer in contact with the first surface; a second clad layer in contact with the second surface and including a polarity; and a metal layer in Schottky contact with the second clad layer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a block diagram illustrating a quantum computing device according to the second embodiment.

DESCRIPTION OF EMBODIMENTS

Figure 1:
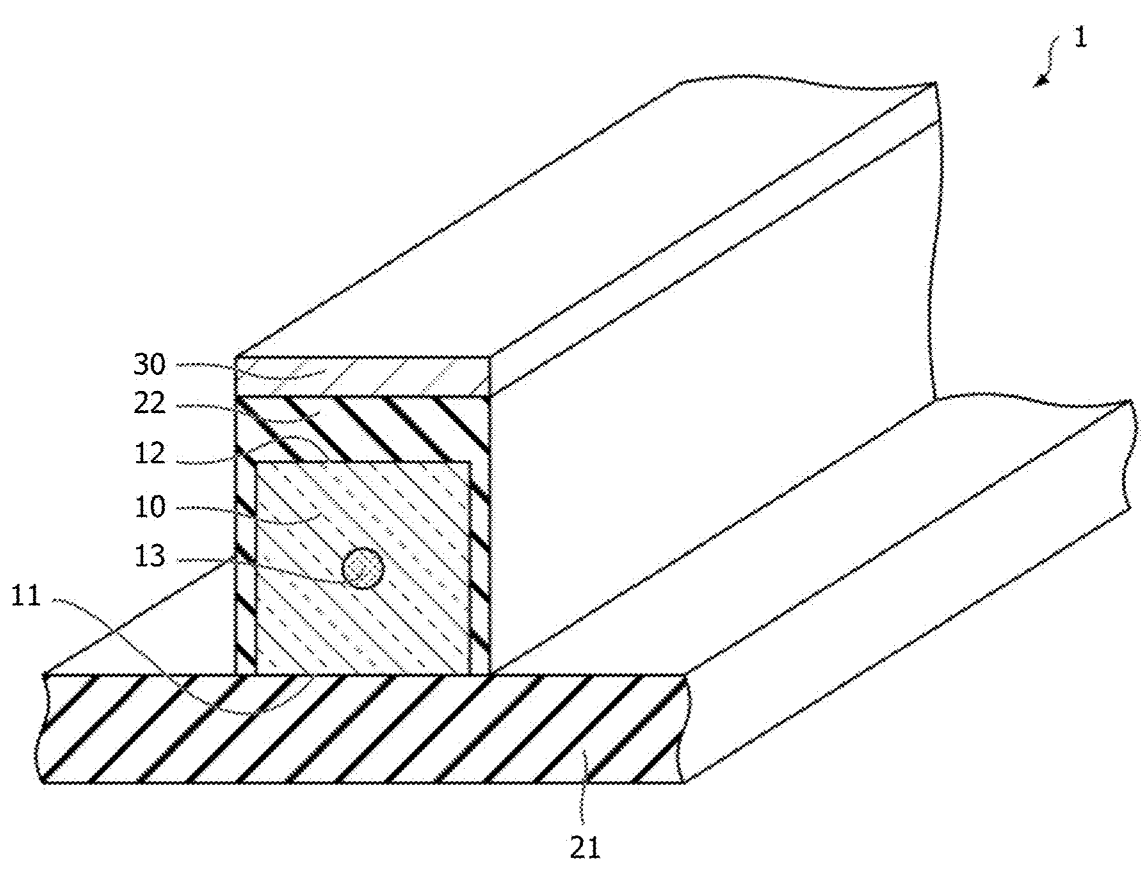
FIG. 1 is a perspective view illustrating an optical waveguide according to a first embodiment.

The quantum computing device is used at an extremely low temperature of about several K, but in a conventional optical waveguide, a charged state of the complex defect tends to become unstable at the extremely low temperature.

A purpose of the present disclosure is to provide an optical waveguide, a quantum computing device, and a method for manufacturing an optical waveguide that are capable of improving the stability of the charged state of the complex defect.

Hereinafter, embodiments of the present disclosure will be specifically described with reference to the accompanying drawings. Note that, in the present description and the drawings, constituent elements having substantially the same functional configuration are denoted by the same reference numerals to omit description thereof in some cases.

First Embodiment

Figure 2:
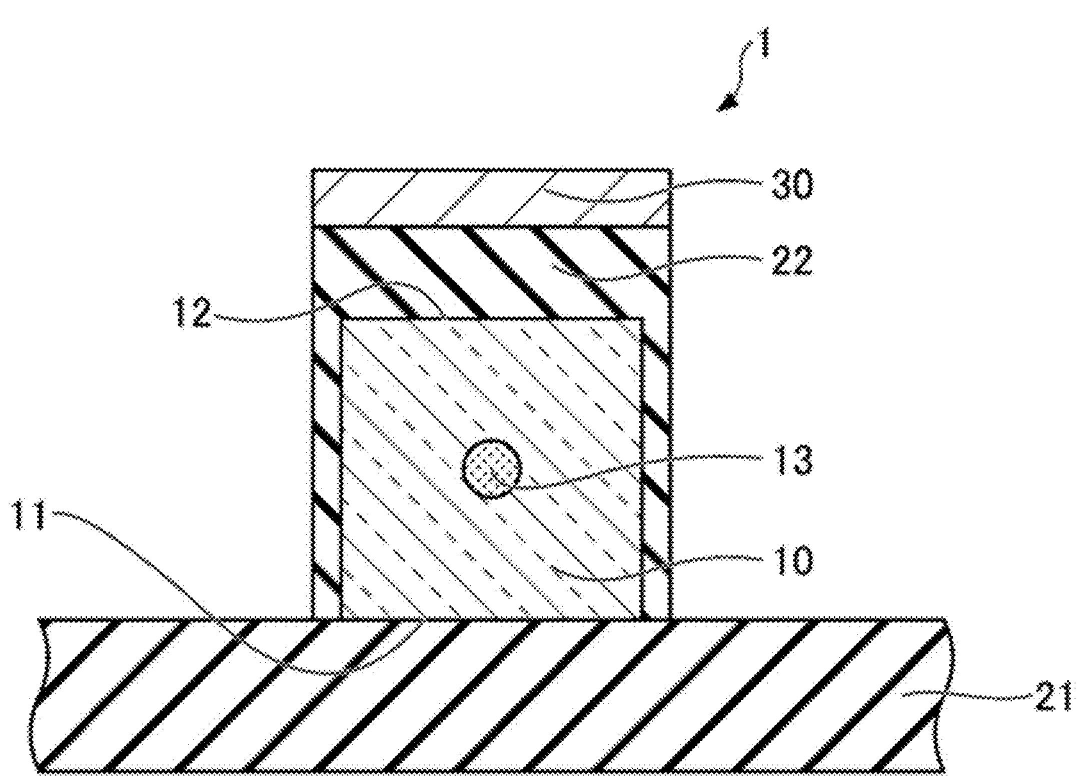
FIG. 2 is a cross-sectional view illustrating the optical waveguide according to the first embodiment.

First, a first embodiment will be described. The first embodiment relates to an optical waveguide. The optical waveguide according to the first embodiment is used in, for example, a quantum computing device such as a quantum computer. FIG. 1 is a perspective view illustrating the optical waveguide according to a first embodiment; FIG. 2 is a cross-sectional view illustrating the optical waveguide according to the first embodiment.

As illustrated in FIGS. 1 and 2, the optical waveguide 1 according to the first embodiment includes a support substrate 21, a diamond layer 10, a clad layer 22, and a metal layer 30.

The support substrate 21 is, for example, a sapphire substrate. The refractive index of the support substrate 21 is lower than that of the diamond layer 10. The refractive index of sapphire is 1.76 and the refractive index of diamond is 2.419. The support substrate 21 may be, for example, an AlN substrate, a BN substrate, a GaN substrate or the like. The refractive index of AlN is 2.1, the refractive index of BN is 2.17, and the refractive index of GaN is 2.38. The support substrate 21 is an example of a first clad layer.

The diamond layer 10 has a first surface 11 and a second surface 12. The support substrate 21 is in contact with the first surface 11. The second surface 12 is a surface opposite to the first surface 11. The diamond layer 10 is, for example, about 250 nm thick. The diamond layer 10 comprises a colour center 13. The color center 13 is, for example, a nitrogen-vacancy center (NV center) composed of nitrogen and a vacancy. The color center 13 may be a silicon-vacancy center (SiV center) composed of silicon and a vacancy, a germanium-vacancy center (GeV center) composed of germanium and a vacancy, a tin-vacancy center (SnV center) composed of tin and a vacancy, a lead-vacancy center (PbV center) composed of lead and a vacancy, or a boron-vacancy center (BV center) composed of boron and a vacancy. The color center 13 is an example of a complex defect.

The clad layer 22 is in contact with the second surface 12 of the diamond layer 10. The clad layer 22 may cover the side surface of the diamond layer 10, for example, the surface coupling the first surface 11 and the second surface 12. The clad layer 22 is about 100 nm thick, for example. The clad layer 22 has polarity in the thickness direction. For example, the clad layer 22 does not have an inversion symmetry center in the thickness direction. The clad layer 22 has, for example, spontaneous polarization oriented from a side of the metal layer 30 to a side of the diamond layer 10. The clad layer 22 includes, for example, a nitride semiconductor. The band gap of the nitride semiconductors is preferably 3.4 eV or more and 6.4 eV or less at room temperature (300K). The clad layer 22 is, for example, an AlN layer. The refractive index of the clad layer 22 is lower than that of the diamond layer 10. The clad layer 22 may be, for example, a BN layer, a GaN layer or the like. The material of the clad layer 22 may be a mixed crystal containing two or three of Al, B, and Ga. The clad layer 22 is an example of a second clad layer.

The metal layer 30 is in Schottky contact with the clad layer 22. The metal layer 30 is made of, for example, a metal having a work function larger than the electron affinity of the nitride semiconductor constituting the clad layer 22. The metal layer 30 is, for example, about 5 nm thick. The metal layer 30 is, for example, an Au layer. The metal layer 30 may be an Ag layer or a Cu layer. The metal layer 30 may be an Al layer.

Figure 3:
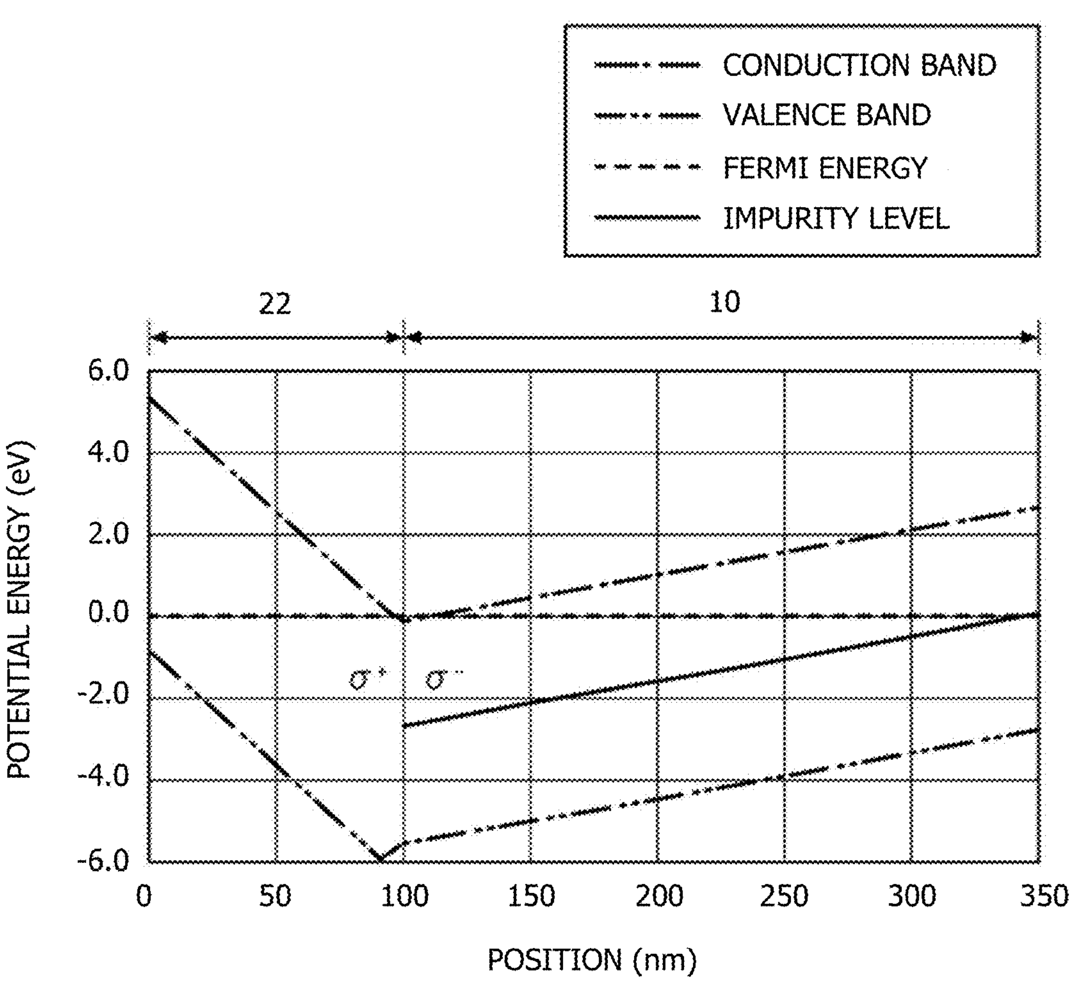
FIG. 3 is a diagram illustrating a band structure in a case where a clad layer is an aluminum nitride (AlN) layer in the optical waveguide according to the first embodiment.

Here, characteristics of the optical waveguide 1 according to the first embodiment will be described. FIG. 3 is a diagram illustrating a band structure in a case where the clad layer 22 is an AlN layer in the optical waveguide 1 according to the first embodiment. FIG. 3 illustrates results of a one dimensional Poisson simulation. In this simulation, the ambient temperature is 5K, the support substrate 21 is a sapphire substrate, the diamond layer 10 is 250 nm thick, the clad layer 22 is 100 nm thick AlN, and the metal layer 30 is 5 nm thick Au layer. Further, the complex defect is an NV center. The horizontal axis in FIG. 3 indicates a position in the depth direction with using the interface between the metal layer 30 and the clad layer 22 as a reference, and the vertical axis indicates a potential energy of electrons formed by the charge distribution.

As illustrated in FIG. 3, due to the Schottky contact between the metal layer 30 and the clad layer 22, almost the entire clad layer 22 is depleted in the thickness direction in a state where there is no bias, for example, in a state where there is 0 bias. This indicates that since the band gap of AlN constituting the clad layer 22 is as large as 6.4 eV and there is no defect level capable of emitting sufficient thermal electrons at 5K which is a preset temperature, almost the entire clad layer 22 is depleted by the Schottky contact in the thickness direction.

Further, the clad layer 22 has a polarity in the thickness direction, and the clad layer 22 has spontaneous polarization oriented from the side of the metal layer 30 to the side of the diamond layer 10, for example. Therefore, the clad layer 22 contains polarization charges ($\sigma^+$) caused by its own spontaneous polarization. For this reason, a considerable amount of negative charge needs to be induced at the interface between the clad layer 22 and the diamond layer 10 in order to satisfy the charge neutrality condition, but the band gap of diamond is as large as 5.4 eV, and at 5K, thermal electrons that alone compensate for the polarization charge ($\sigma^+$) of the clad layer 22 are insufficient. Therefore, negative fixed charges ($\sigma^-$) are induced in the vicinity of the second surface 12 of the diamond layer 10. The density of the negative fixed charges is, for example, $10^{12}/cm^2$.

Furthermore, since the band offset at the interface between the clad layer 22 and the diamond layer 10 is small, the Fermi energy of the diamond layer 10 is higher than the activation energy (−2.58 eV) of the color center 13 over substantially the entire depth direction. Therefore, a state in which the color center 13 is easily negatively charged is formed.

According to the first embodiment like this, it is easy to maintain the state in which the color center 13 is negatively charged even at an extremely low temperature of about 5K. For example, according to the first embodiment, the stability of the charged state of the color center 13 can be improved.

Next, a method of manufacturing the optical waveguide 1 according to the first embodiment will be described. FIGS. 4 to 9 are cross-sectional views illustrating a method for manufacturing the optical waveguide 1 according to the first embodiment.

Figure 4:
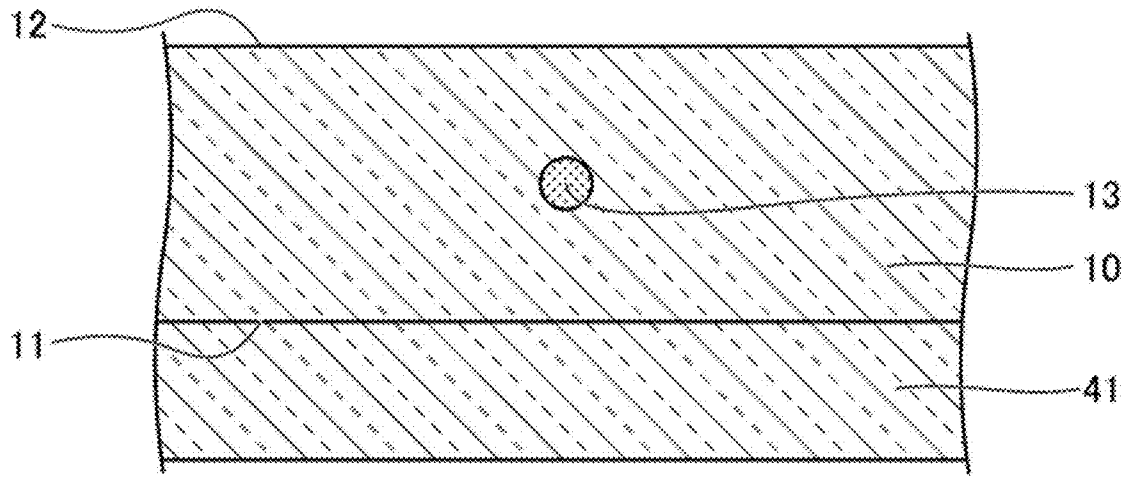
FIG. 4 is a cross-sectional view (part 1) illustrating a method for manufacturing the optical waveguide according to the first embodiment.

First, as illustrated in FIG. 4, a diamond substrate 41 is prepared and a diamond layer 10 is formed over the diamond substrate 41. As the diamond substrate 41, for example, a type IIa diamond substrate having a nitrogen content of less than 5 ppb is used. The diamond layer 10 may be formed by, for example, a chemical vapor deposition (CVD) method.

A color center 13 is formed at a desired depth by temporarily adding a gas containing impurity atoms to a raw material gas during the formation of a diamond layer 10. When the NV center is formed as the color center 13, for example, a NH3 gas is temporarily added. In this way, color centers 13 may be formed in-situ.

Figure 5:
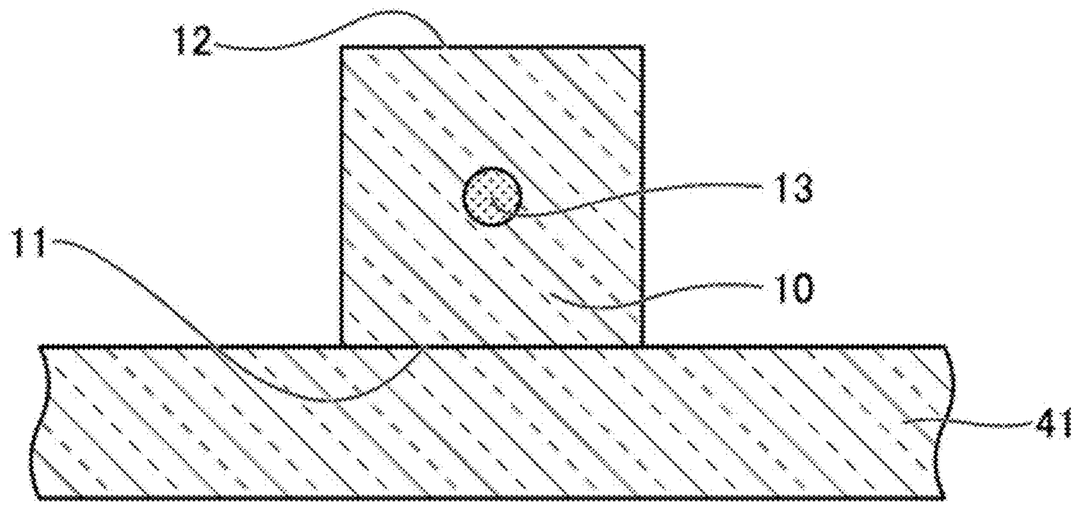
FIG. 5 is a cross-sectional view (part 2) illustrating the method for manufacturing the optical waveguide according to the first embodiment.

Next, as illustrated in FIG. 5, the diamond layer 10 is processed into a shape of a core layer of an optical waveguide by using, for example, a focused ion beam (FIB).

Figure 6:
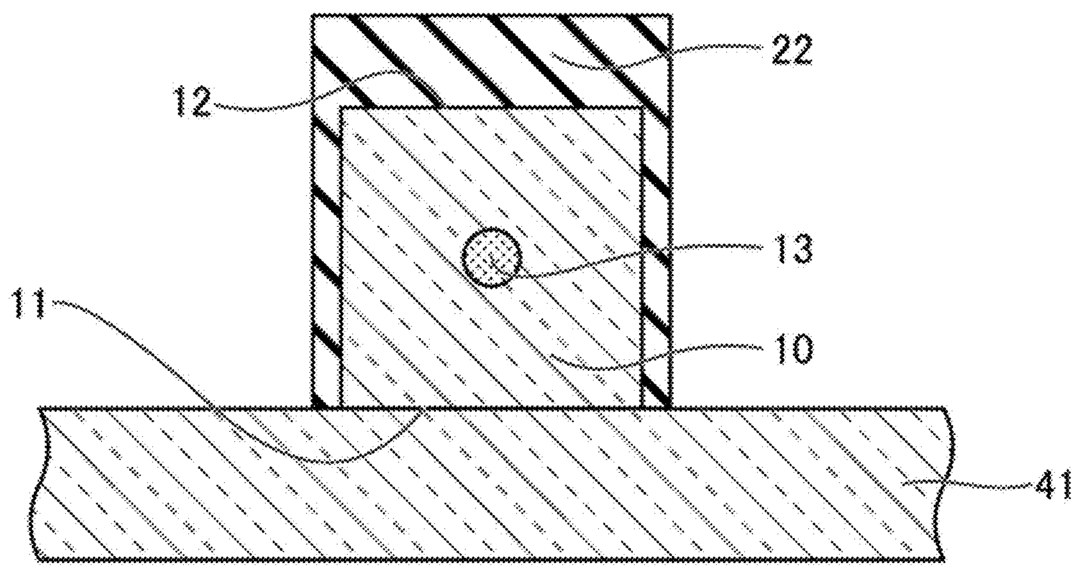
FIG. 6 is a cross-sectional view (part 3) illustrating the method for manufacturing the optical waveguide according to the first embodiment.

Thereafter, as illustrated in FIG. 6, a clad layer 22 is formed over the diamond layer 10. The clad layer 22 may be formed by, for example, a metal organic chemical vapor deposition (MOCVD) method. The clad layer 22 is formed so as to cover the second surface 12 of the diamond layer 10. The clad layer 22 may cover the side surface of the diamond layer 10. The clad layer 22 may also be formed over the diamond substrate 41.

Figure 7:
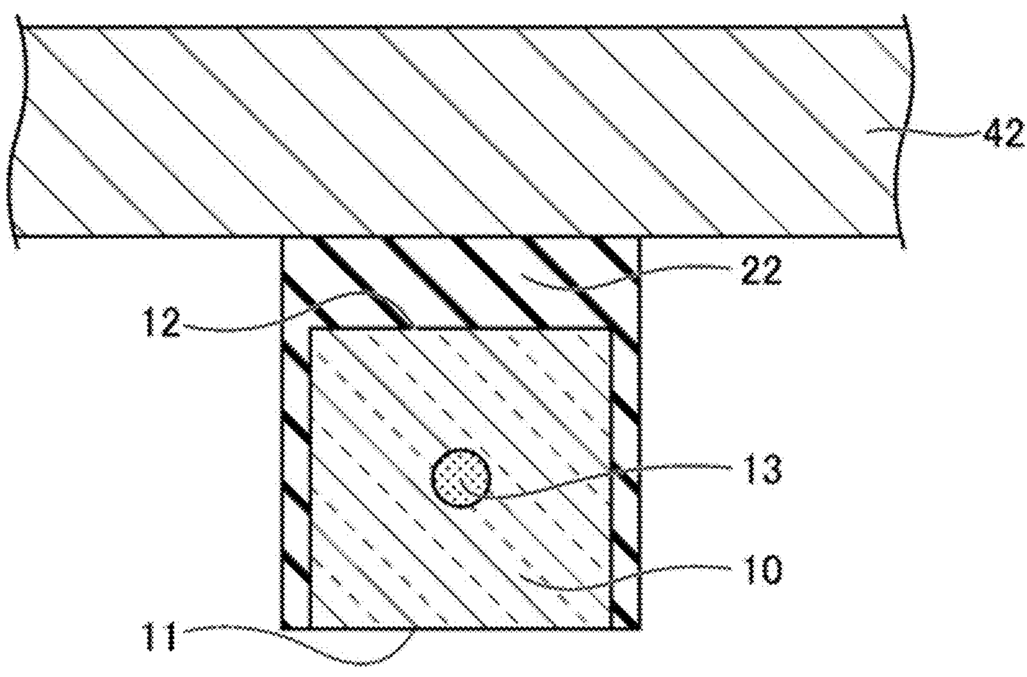
FIG. 7 is a cross-sectional view (part 4) illustrating the method for manufacturing the optical waveguide according to the first embodiment.

Subsequently, as illustrated in FIG. 7, a transfer substrate 42 is bonded to the upper surface of the clad layer 22. Next, diamond substrate 41 is removed by grinding.

Figure 8:
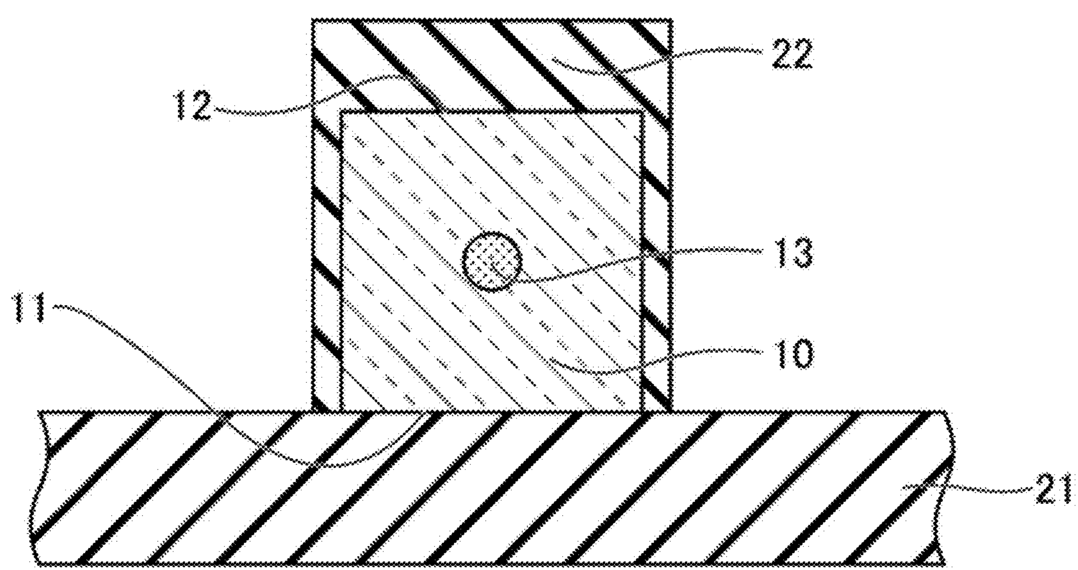
FIG. 8 is a cross-sectional view (part 5) illustrating the method for manufacturing the optical waveguide according to the first embodiment.

Thereafter, as illustrated in FIG. 8, the diamond layer 10 is bonded to the support substrate 21. The first surface 11 of the diamond layer 10 is in contact with the support substrate 21. Subsequently, the transfer substrate 42 is removed.

Figure 9:
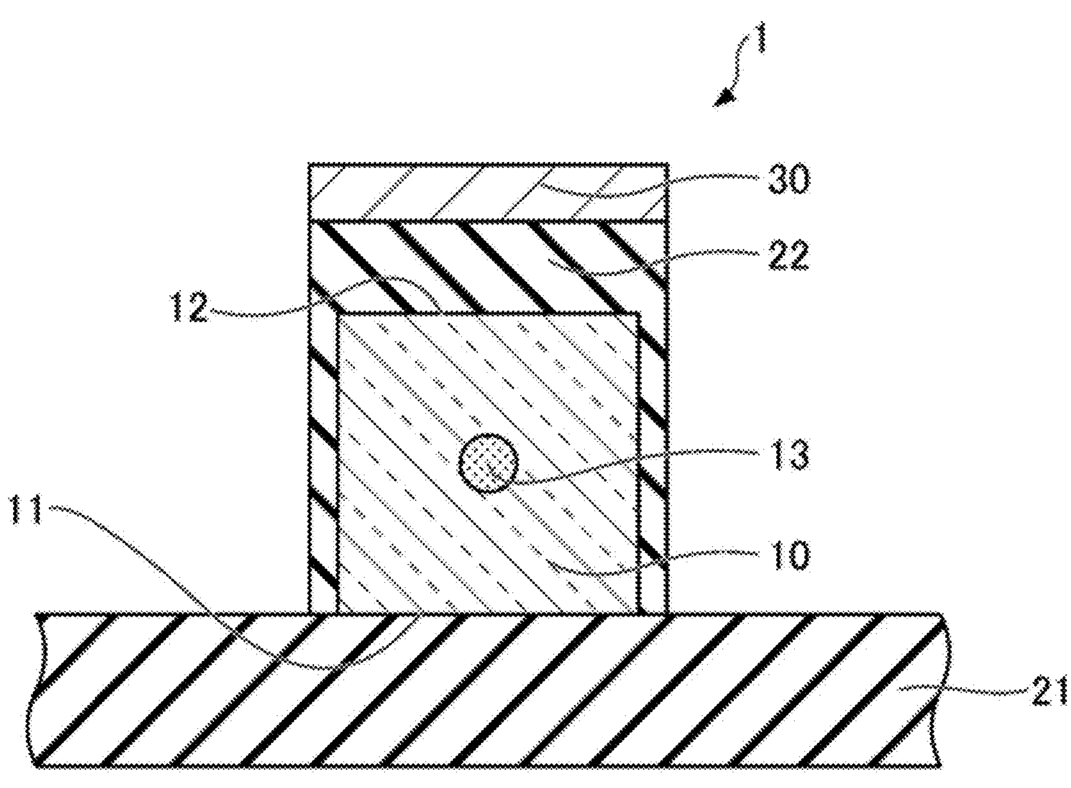
FIG. 9 is a cross-sectional view (part 6) illustrating the method for manufacturing the optical waveguide according to the first embodiment.

Next, as illustrated in FIG. 9, the metal layer 30 is formed over the clad layer 22. In the formation of the metal layer 30, for example, a resist film having an opening in a region where the metal layer 30 is to be formed is formed by a photolithography technique, an Au layer is formed by a vapor deposition method using the resist film as a growth mask, and the resist film is removed together with the Au layer thereon. For example, the metal layer 30 may be formed by deposition and lift-off.

In this way, the optical waveguide 1 according to the first embodiment may be manufactured.

The diamond layer 10 may be formed by forming the color center 13 in the diamond substrate 41 by ion implantation or the like and processing the diamond substrate 41 into the shape of the core layer of the optical waveguide.

Figure 10:
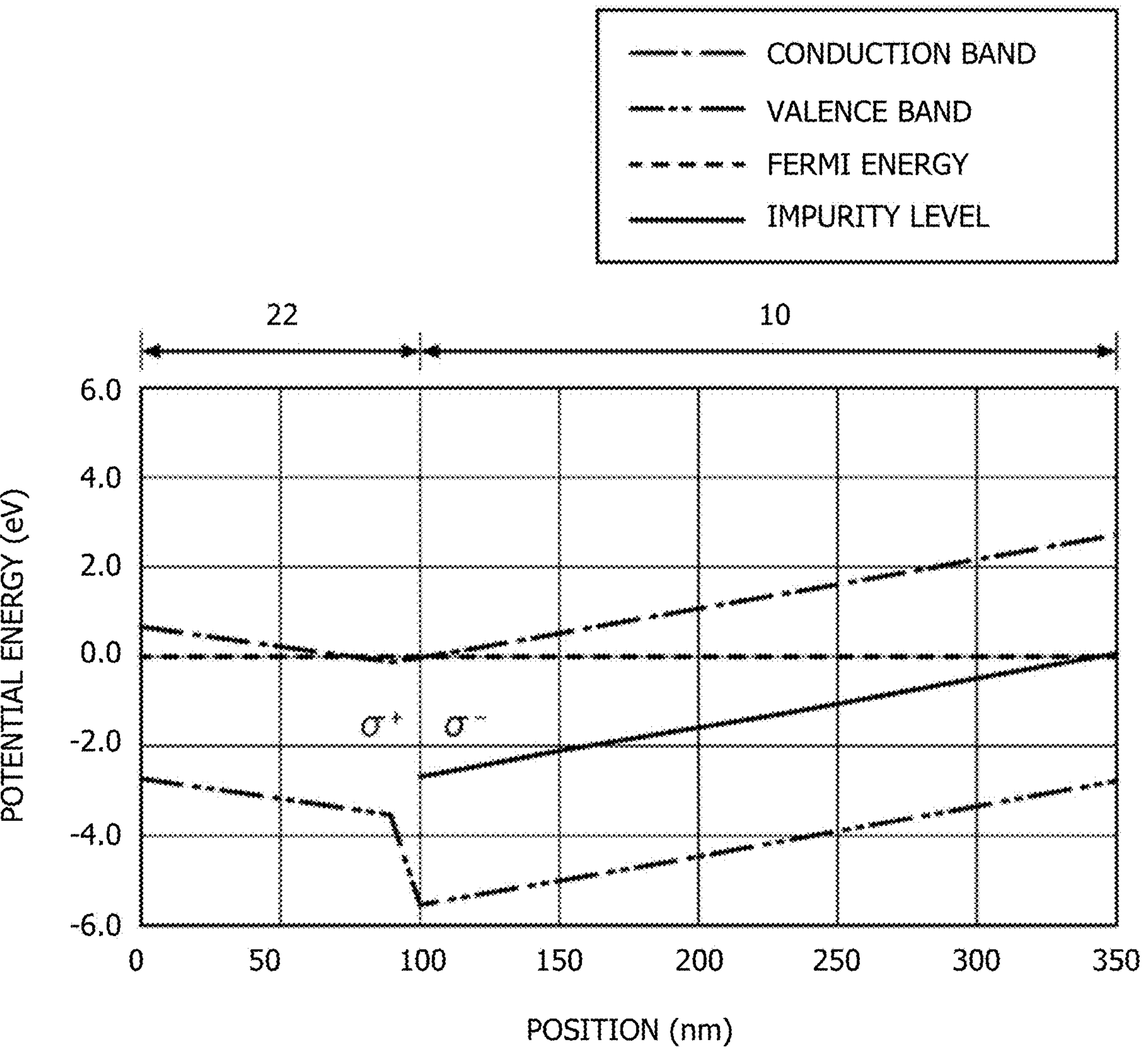
FIG. 10 is a diagram illustrating a band structure in a case where a clad layer is a gallium nitride (GaN) layer in the optical waveguide according to the first embodiment.
Figure 11:
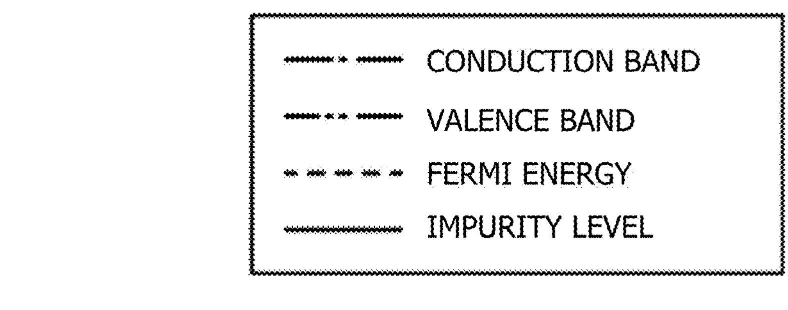
FIG. 11 is a diagram illustrating a band structure in a case where a clad layer is a boron nitride (BN) layer in the optical waveguide according to the first embodiment.
Figure 11:
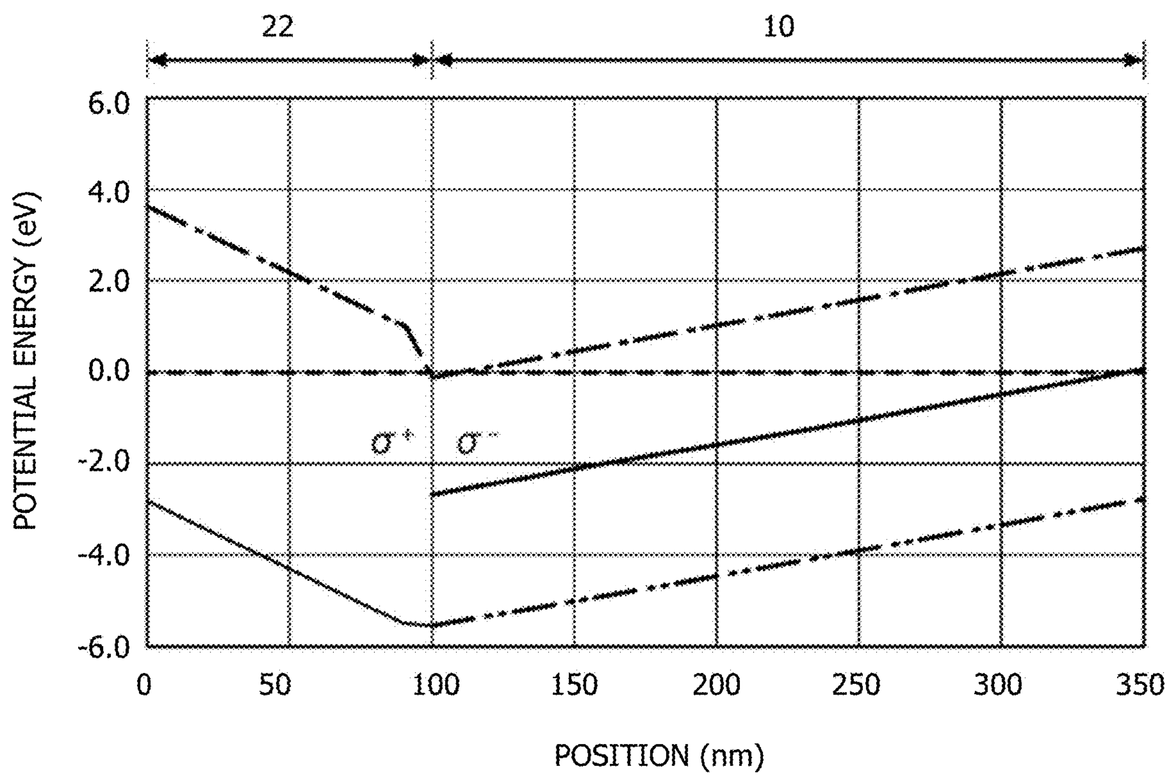

As described above, the clad layer 22 may be a GaN layer or a BN layer. FIG. 10 is a diagram illustrating a band structure in a case where the clad layer 22 is a GaN layer in the optical waveguide 1 according to the first embodiment. FIG. 11 is a diagram illustrating a band structure in a case where the clad layer 22 is a BN layer in the optical waveguide 1 according to the first embodiment.

As illustrated in FIG. 10, also in the case where the clad layer 22 is a GaN layer, almost the entire clad layer 22 is depleted in a state where there is no bias, negative fixed charges are induced in the vicinity of the second surface 12 of the diamond layer 10, and the state in which the color center 13 is easily negatively charged is formed. Similarly, as illustrated in FIG. 11, also when the clad layer 22 is a BN layer, almost the entire clad layer 22 is depleted in the absence of bias, negative fixed charges are induced in the vicinity of the second surface 12 of the diamond layer 10, and the state is formed in which the color center 13 is easily negatively charged.

Figure 12:
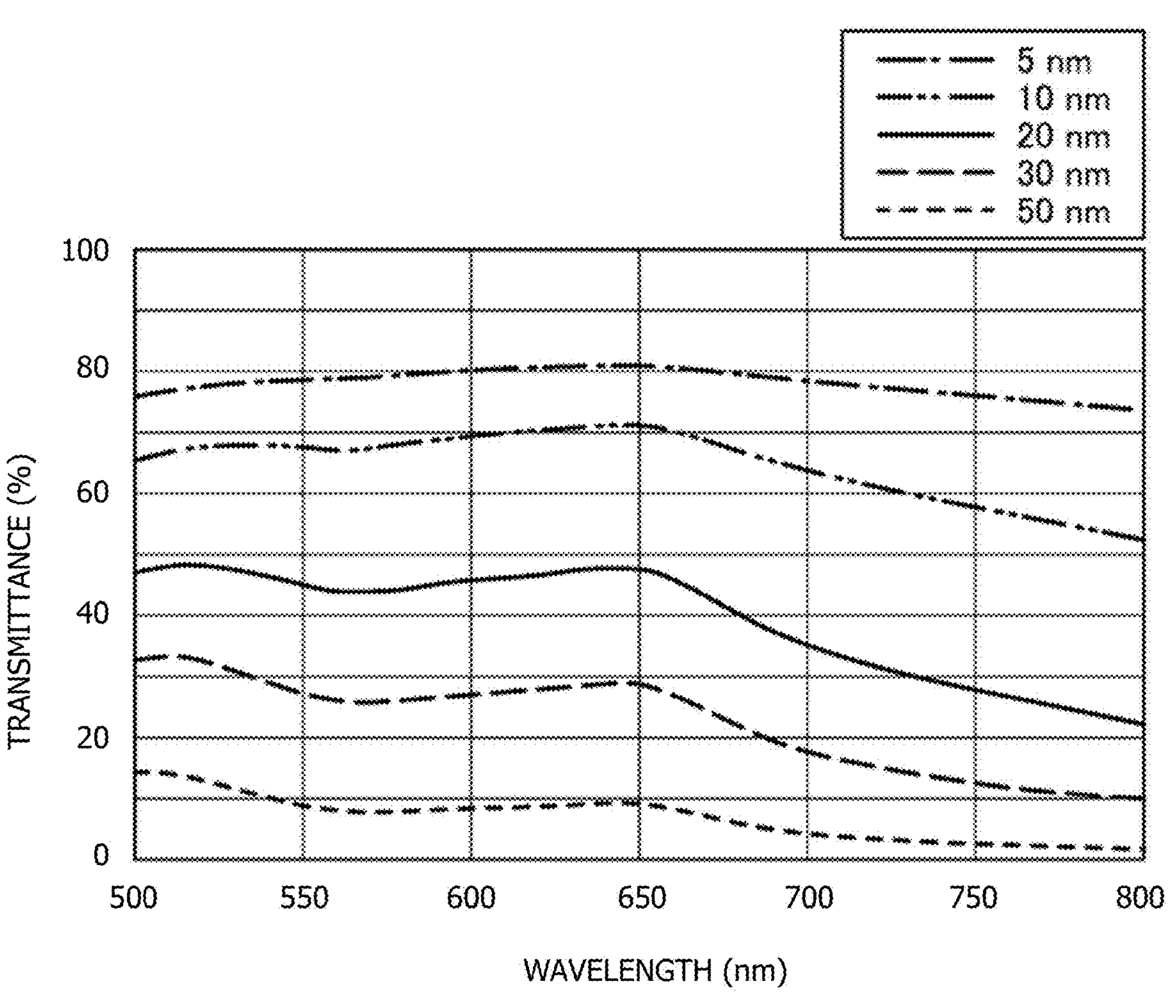
FIG. 12 is a diagram illustrating a relationship between a wavelength of light and a transmittance in Au layers having various thicknesses.

The optical waveguide 1 may be irradiated with light through the support substrate 21, through the metal layer 30 and the clad layer 22, or directly to the diamond layer 10. Here, the relationship between the wavelength of light and the transmittance in the Au layer will be described. FIG. 12 is a diagram illustrating the relationship between the wavelength of light and the transmittance in Au layers having various thicknesses. In FIG. 12, the horizontal axis represents the wavelength of the irradiated light, and the vertical axis represents the transmittance.

When the wavelength of light propagating through the optical waveguide 1 is 520 nm to 740 nm, as illustrated in FIG. 12, a transmittance of 60% or more may be obtained if the thickness of the Au layer is 10 nm or less. Therefore, the thicknesses of the Au layer used for the metal layer 30 is preferably 10 nm or less, more preferably 5 nm or less. For example, when the Au layer is 5 nm thick, a transmittance of about 80% may be obtained for light of 650 nm wavelength.

Figure 13:
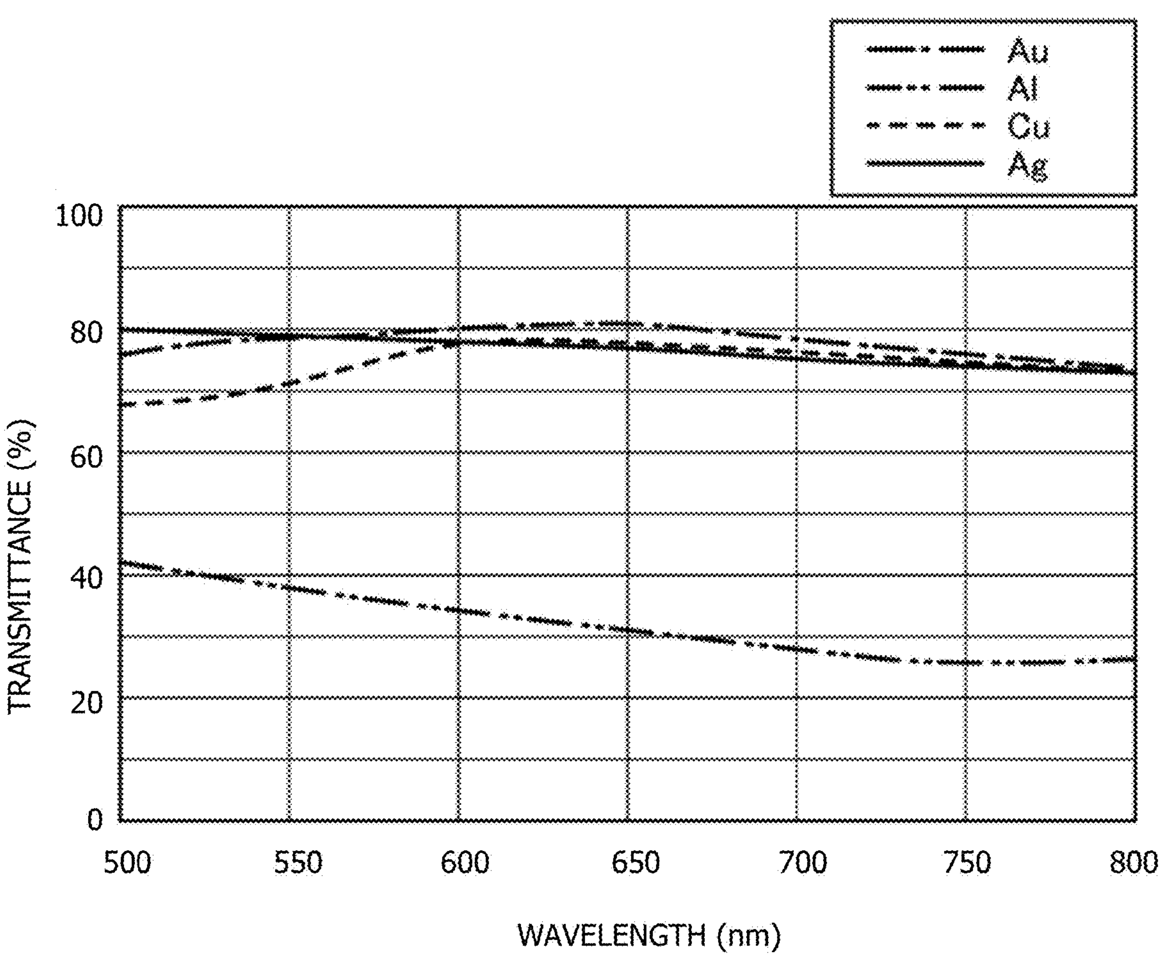
FIG. 13 is a diagram illustrating the relationship between the wavelength of light and the transmittance in various metal layers.

As described above, the metal layer 30 may be an Ag layer, a Cu layer or an Al layer. Here, the relationship between the material of the metal layer 30 and the transmittance will be described. FIG. 13 is a diagram illustrating the relationship between the wavelength of light and the transmittance in various metal layers. In FIG. 13, the horizontal axis represents the wavelength of the irradiated light, and the vertical axis represents the transmittance. Note that the thickness of each of the metal layers is 5 nm.

When the wavelength of light propagating through the optical waveguide 1 is 520 nm to 740 nm, as illustrated in FIG. 13, a transmittance of 70% or more is obtained in the Au layer, the Ag layer, or the Cu layer. On the other hand, the transmittance of the Al layer is 40% or less. Therefore, when the diamond layer 10 is irradiated with light through the metal layer 30 and the clad layer 22, the metal layer 30 is preferably an Au layer, an Ag layer, or a Cu layer.

Figure 14:
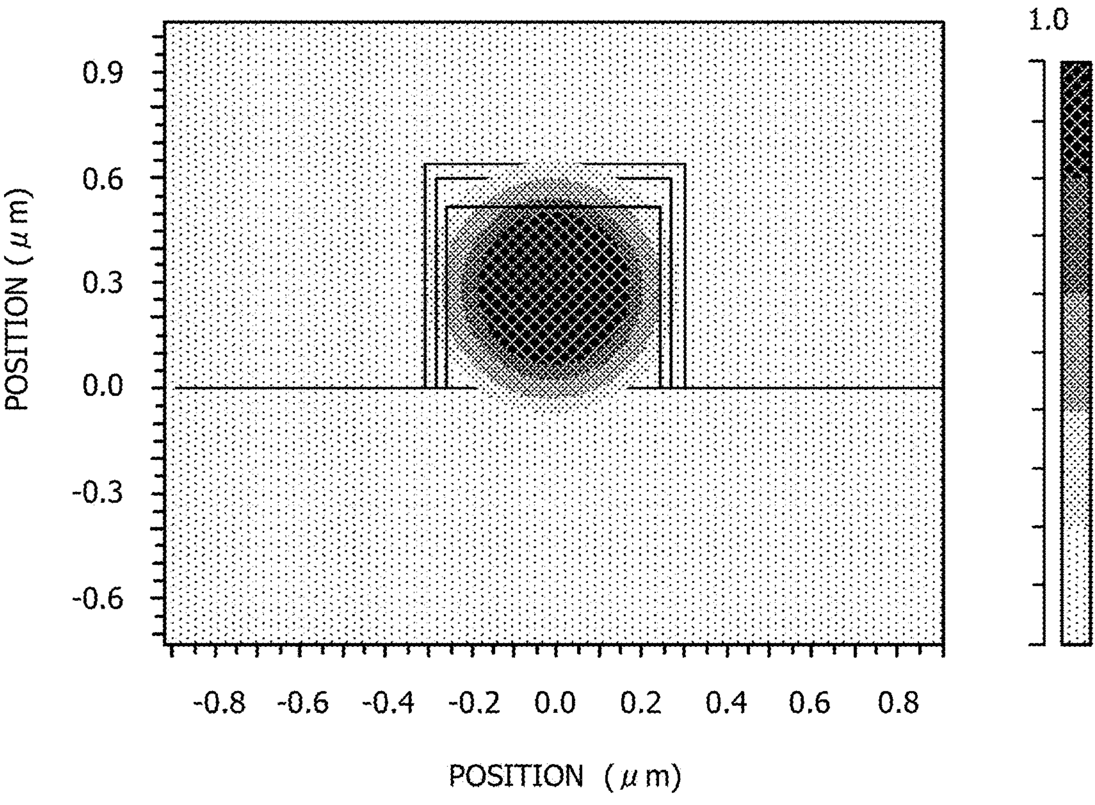
FIG. 14 is a diagram (part 1) illustrating a distribution of an intensity of propagating light in a zero (0) order transverse mode in a cross section perpendicular to a longitudinal direction of a diamond layer.
Figure 15:
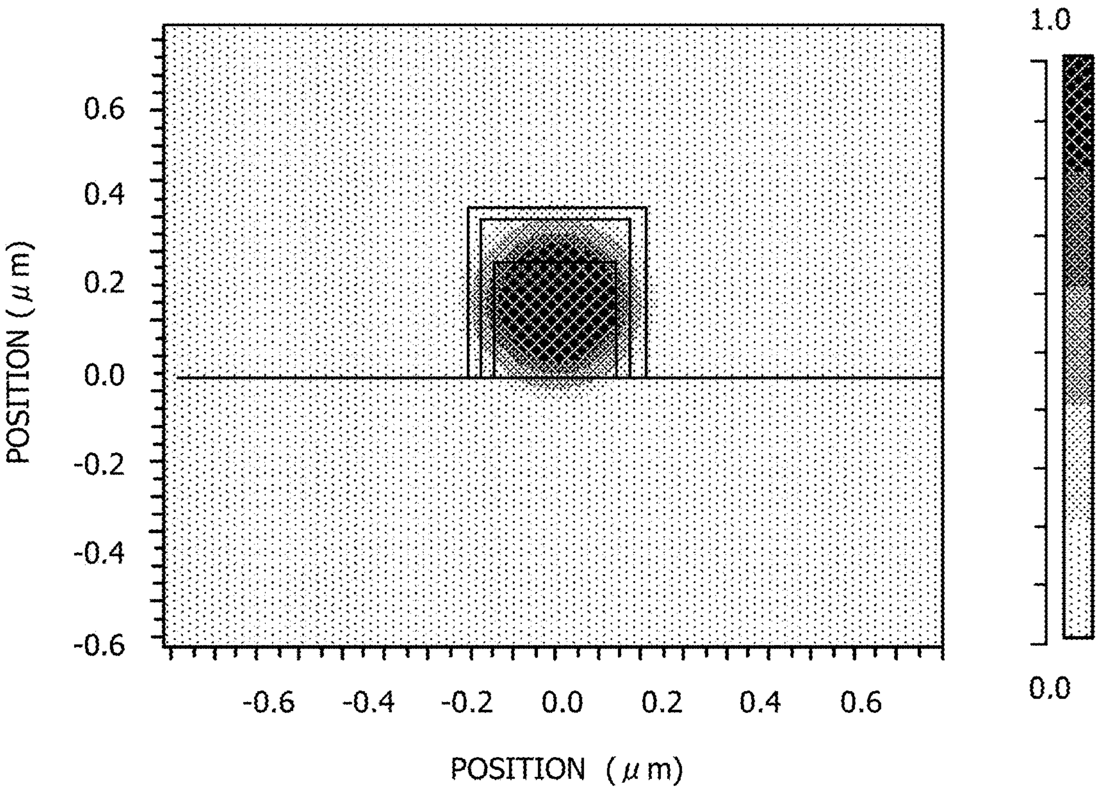
FIG. 15 is a diagram (part 2) illustrating the distribution of the intensity of propagating light in the 0 order transverse mode in the cross section perpendicular to the longitudinal direction of the diamond layer.
Figure 16:
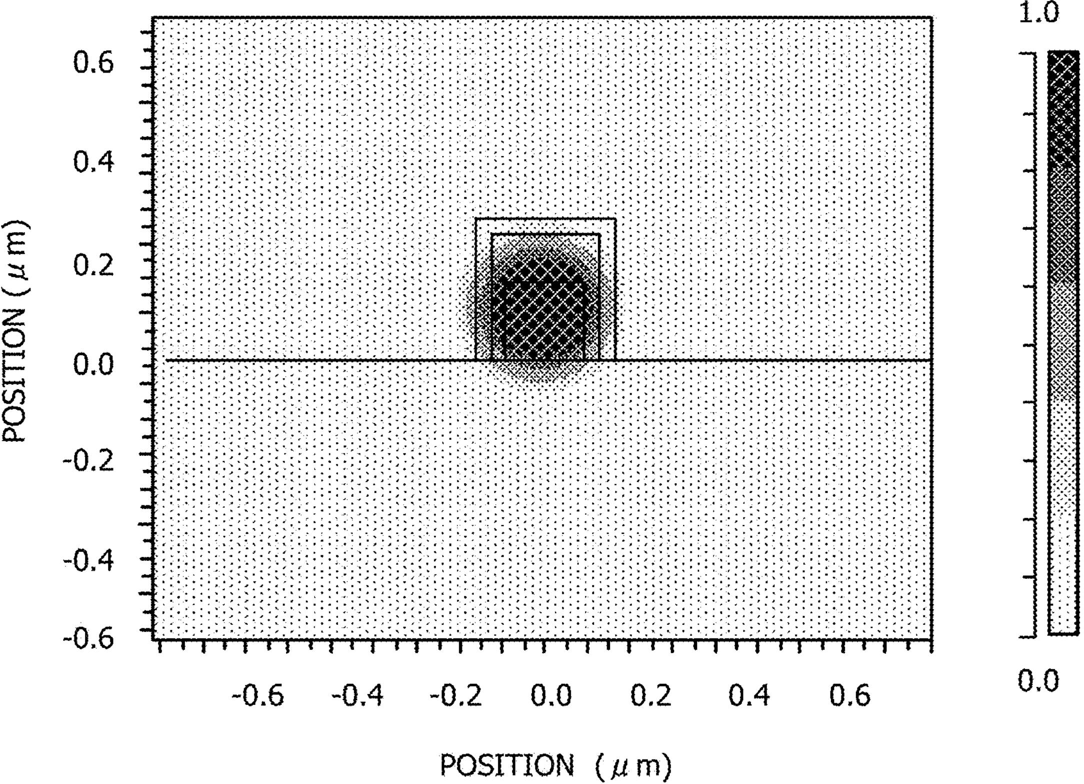
FIG. 16 is a diagram (part 3) illustrating the distribution of the intensity of propagating light in the 0 order transverse mode in the cross section perpendicular to the longitudinal direction of the diamond layer.

Next, the core diameter dependence of the propagation characteristics of the 0 order transverse mode in the optical waveguide 1 according to the first embodiment will be described. FIGS. 14 to 16 are diagrams illustrating the distribution of the intensity of propagating light in the 0 order transverse mode in a cross section perpendicular to the longitudinal direction of the diamond layer 10. FIG. 14 illustrates the distribution of the intensity of the propagating light when the cross-sectional shape of the diamond layer 10 has a side length of 500 nm. FIG. 15 illustrates the distribution of the intensity of the propagating light when the cross-sectional shape of the diamond layer 10 has a side length of 250 nm. FIG. 16 illustrates the distribution of the intensity of the propagating light when the cross-sectional shape of the diamond layer 10 has a side length of 150 nm. The horizontal axis in FIGS. 14 to 16 indicates a position in a direction (width direction) parallel to the first surface 11 with the center of the diamond layer 10 as a reference, and the vertical axis indicates a position in a direction (thickness direction) perpendicular to the first surface 11 with the center of the diamond layer 10 as a reference. In this calculation, it is assumed that the light is a continuous wave having a Gaussian intensity distribution and a progressive wave having a wave number vector in a direction perpendicular to the cross section of the optical waveguide 1.

As illustrated in FIGS. 14 to 16, in any case, single-mode propagation in the diamond layer 10 functioning as a core is realized. However, when the length of one side is less than the 150 nm, a leakage electromagnetic field (evanescent field) to a side of the support substrate 21 becomes remarkable, and there is a concern that a propagation loss occurs. Therefore, when the cross-sectional shape of the diamond layer 10 is a square, the length of one side is preferably equal to or greater than the 150 nm, and in general, the short diameter is preferably equal to or greater than the 150 nm.

Figure 17:
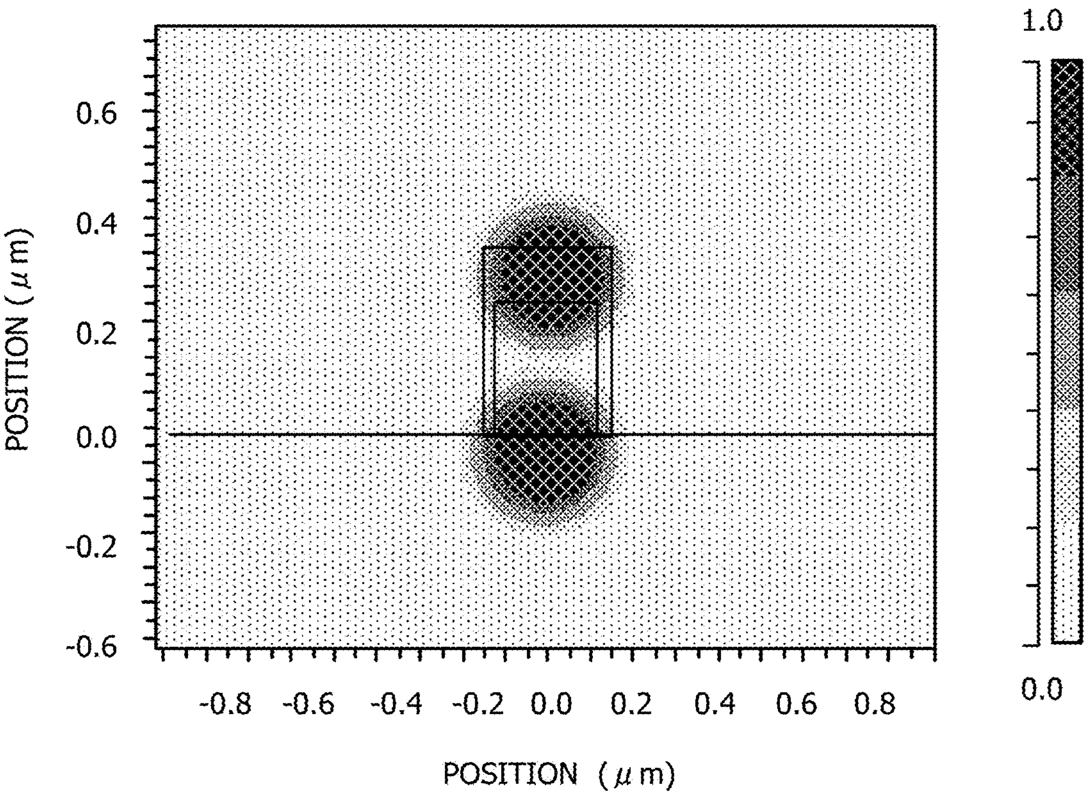
FIG. 17 is a diagram (part 1) illustrating a distribution of an intensity of propagating light in a first order mode in a cross section perpendicular to a longitudinal direction of a diamond layer.
Figure 18:
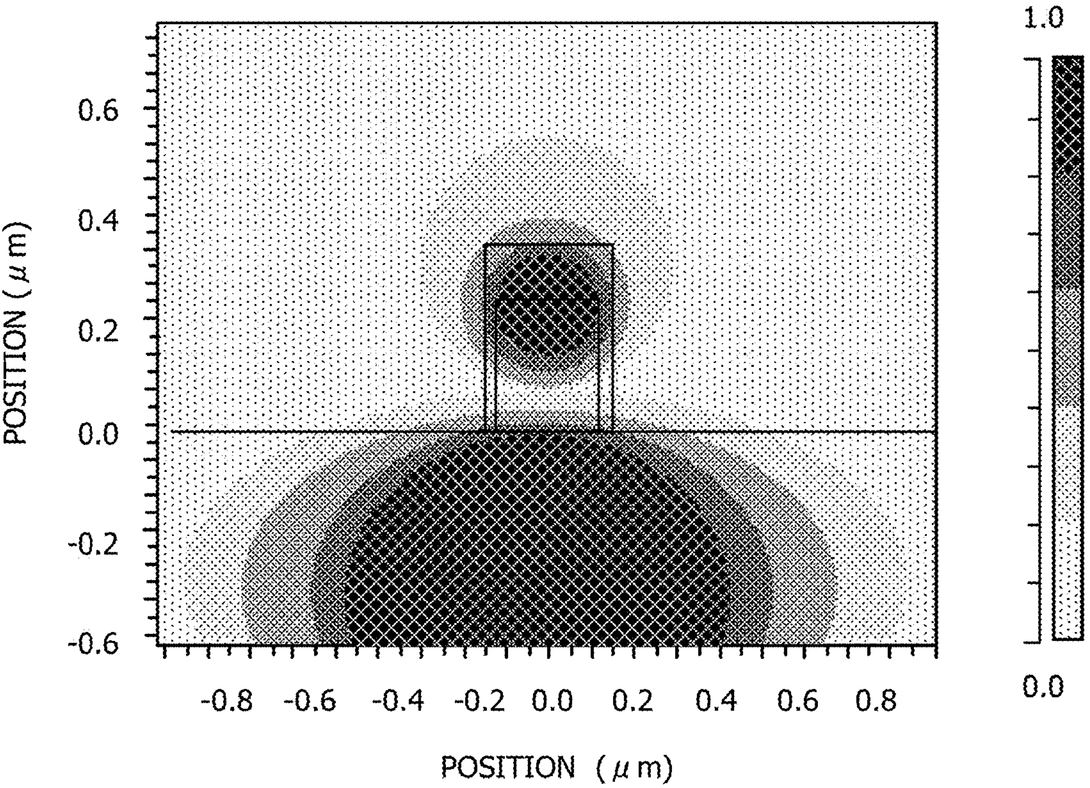
FIG. 18 is a diagram (part 2) illustrating the distribution of the intensity of propagating light in the first order mode in the cross section perpendicular to the longitudinal direction of the diamond layer.
Figure 19:
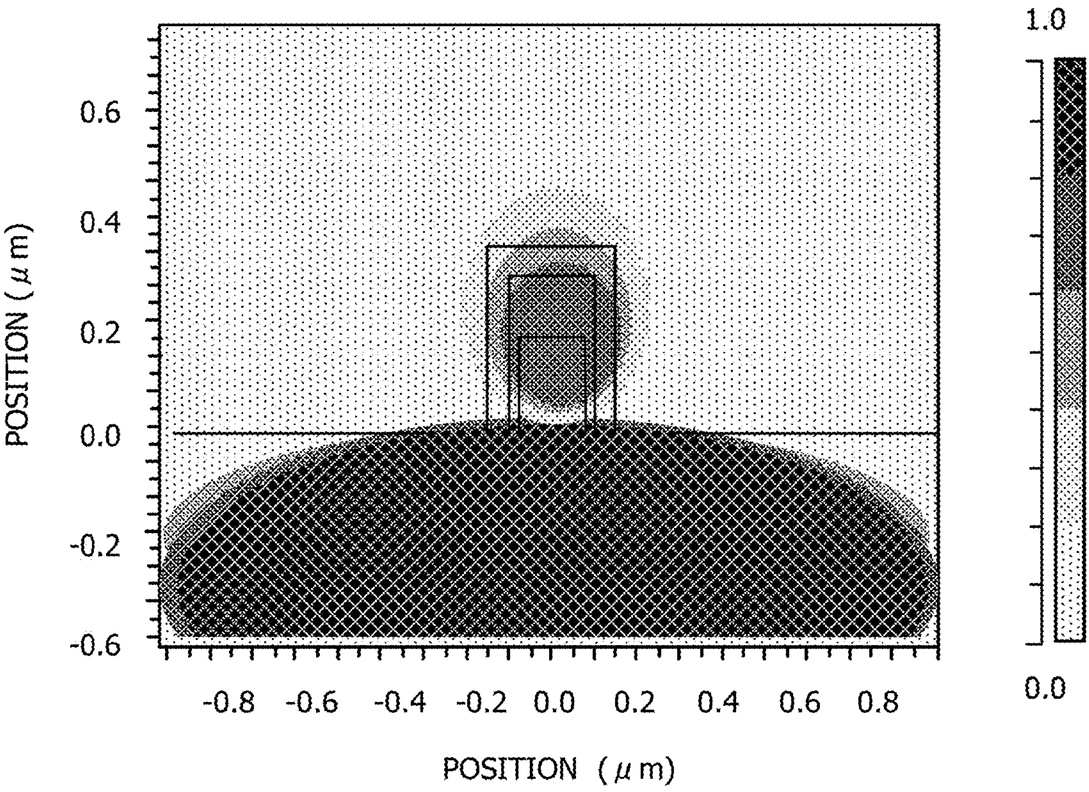
FIG. 19 is a diagram (part 3) illustrating the distribution of the intensity of propagating light in the first order mode in the cross section perpendicular to the longitudinal direction of the diamond layer.

Next, the core diameter dependence of the propagation characteristics of the higher-order mode (first order mode) in the optical waveguide 1 according to the first embodiment will be described. FIGS. 17 to 19 are diagrams illustrating the distribution of the intensity of propagating light in the first order mode in a cross section perpendicular to the longitudinal direction of the diamond layer 10. FIG. 17 illustrates the distribution of the intensity of the propagating light when the cross-sectional shape of the diamond layer 10 has a side length of 250 nm. FIG. 18 illustrates the distribution of the intensity of the propagating light when the cross-sectional shape of the diamond layer 10 has a side length of 200 nm. FIG. 19 illustrates the distribution of the intensity of the propagating light when the cross-sectional shape of the diamond layer 10 has a side length of 150 nm. The horizontal axis in FIGS. 17 to 19 indicates a position in a direction (width direction) parallel to the first surface 11 with the center of the diamond layer 10 as a reference, and the vertical axis indicates a position in a direction (thickness direction) perpendicular to the first surface 11 with the center of the diamond layer 10 as a reference. In this calculation, it is assumed that the light is a continuous wave having a Gaussian intensity distribution and a progressive wave having a wave number vector in a direction perpendicular to the cross section of the optical waveguide 1.

As illustrated in FIGS. 17 to 19, when the length of one side exceeds 250 nm, there is a concern that the wave guide propagation by the high-order mode cannot be ignored. Therefore, when the cross-sectional shape of the diamond layer 10 is a square, the length of one side is preferably equal to or less than the 250 nm, and in general, the short diameter is preferably equal to or less than the 250 nm.

From the above, the short diameter in the cross section perpendicular to the longitudinal direction of the diamond layer 10 is preferably not less than 150 nm and not more than 250 nm, and more preferably not less than 170 nm and not more than 230 nm.

The metal layer 30 does not need to cover the entire upper surface of the clad layer 22. The metal layer 30 preferably overlaps at least the color center 13 in a plan view from a direction perpendicular to the second surface 12.

Second Embodiment

Next, a second embodiment will be described. The second embodiment relates to a quantum computing device including the optical waveguide 1 according to the first embodiment. FIG. 20 is a block diagram illustrating a quantum computing device according to the second embodiment.

As illustrated in FIG. 20, the quantum computing device 2 according to the second embodiment includes a plurality of optical waveguides 1. The quantum-computing device 2 includes an arithmetic unit 51, a He-cryostat 52, a beam splitter 53, a first single-photon detector 54A, a second single-photon detector 54B, a comparator 55, and an analog-to-digital (A/D) converter 56. The quantum computing device 2 includes a plurality of control systems 61 and a plurality of optical waveguides 62.

The He cryostat 52 accommodates the plurality of optical waveguides 1 and cools temperatures of the plurality of optical waveguides 1 to an extremely low temperature. The control system 61 is provided for each single color center 13 constituting a quantum bit, and applies a magnetic field, an electric field, a microwave, a laser beam, or the like to the color center 13. For example, the magnetic field and the electric field are used for adjusting the intrinsic energy of the color center 13 (adjusting the frequency of the state readout photon), the microwave is used for controlling the quantum state of the color center 13, and the laser light is used for state readout (generating a single photon). The optical waveguide 62 is installed so that arbitrary two paths are oppositely incident on each optical waveguide 1 at the beam splitter 53. Each optical waveguide 62 is configured so that the optical path length from the color center 13 to the beam splitter 53 is substantially equal.

The beam splitter 53 splits the incident light and outputs it to the first single-photon detector 54A and the second single-photon detector 54B, respectively. The first single-photon detector 54A and the second single-photon detector 54B detect single-photons from the light output by the beam splitter 53. The comparator 55 compares the single-photon detection signal from the first single-photon detector 54A with the single-photon detection signal from the second single-photon detector 54B. For example, the comparator 55 specifies which of the first single-photon detector 54A and the second single-photon detector 54B has detected and an order of detection by the first single-photon detector 54A and the second single-photon detector 54B. The arithmetic unit 51 analyzes the output from the comparator 55. The A/D converter 56 converts an analog control signal output from the arithmetic unit 51 into a digital signal and outputs the digital signal to each control system 61.

The quantum computing device 2 includes the optical waveguide 1, and the color center 13 is used as a quantum bit. For this reason, the charged state of the color center 13 is stable even at an extremely low temperature, and it is possible to obtain excellent reliability of the analysis result.

Although preferred embodiments and the like have been described in detail above, the present disclosure is not limited to the above-described embodiments and the like, and various modifications and substitutions may be added to the above-described embodiments and the like without departing from the scope described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide including:

a diamond layer including a first surface, a second surface and a diamond layer including a complex defect;

a first clad layer in contact with the first surface;

a second clad layer in contact with the second surface and including a polarity; and a metal layer in Schottky contact with the second clad layer, the second clad layer has spontaneous polarization which is oriented from a side of the metal layer to a side of the diamond layer.

2. The optical waveguide according to claim 1, wherein a refractive index of the first clad layer and a refractive index of the second clad layer are smaller than a refractive index of the diamond layer.

3. The optical waveguide according to claim 1, wherein the metal layer overlaps at least the complex defect in a plan view.

4. The optical waveguide according to claim 1, wherein the complex defect is composed of at least one of nitrogen, silicon, germanium, tin, lead and boron and a vacancy.

5. The optical waveguide according to claim 1, wherein the second clad layer includes a nitride semiconductor.

6. The optical waveguides according to claim 5, wherein a band gap of the nitride semiconductor is not less than 3.4 eV and not more than 6.4 eV at a room temperature.

7. The optical waveguide according to claim 1, wherein a short diameter in a cross section perpendicular to a longitudinal direction of the diamond layer is not less than 150 nm and not more than 250 nm.

8. The optical waveguide according to claim 1, wherein the metal layer contains Au, Cu, or Ag, and a thickness of the metal layer is equal to or less than 10 nm.

9. The optical waveguide according to claim 1, wherein the first clad layer includes a support substrate.

10. A quantum computing device comprising:

an optical waveguide including:

a diamond layer including a first surface, a second surface and a complex defect;

a first clad layer in contact with the first surface;

a second clad layer in contact with the second surface and including a polarity; and a metal layer in Schottky contact with the second clad layer; and a control system configured to apply a magnetic field, an electric field, a microwave or a laser beam to the optical waveguide, the second clad layer has spontaneous polarization which is oriented from a side of the metal layer to a side of the diamond layer.

11. A method of manufacturing an optical waveguide comprising:

forming a diamond layer including a first surface, a second surface and a diamond layer including a complex defect;

forming a first clad layer in contact with the first surface;

forming a second clad layer in contact with the second surface and including a polarity; and forming a metal layer in Schottky contact with the second clad layer, the second clad layer has spontaneous polarization which is oriented from a side of the metal layer to a side of the diamond layer.

12. The method according to claim 11, wherein a refractive index of the first clad layer and a refractive index of the second clad layer are smaller than a refractive index of the diamond layer.

13. The method according to claim 11, wherein the metal layer overlaps at least the complex defect in a plan view.

* * * * *